April 20, 1954 R. ADLER Re. 23,813

PIEZOELECTRIC TRANSDUCER AND METHOD FOR PRODUCING SAME

Original Filed Dec. 26, 1947 2 Sheets-Sheet 1

ROBERT ADLER
*INVENTOR.*

BY Francis W. Crotty

HIS ATTORNEY.

PIEZOELECTRIC TRANSDUCER AND METHOD FOR PRODUCING SAME

Original Filed Dec. 26, 1947 2 Sheets-Sheet 2

ROBERT ADLER
*INVENTOR.*

BY Francis W. Crotty

HIS ATTORNEY.

Reissued Apr. 20, 1954

Re. 23,813

UNITED STATES PATENT OFFICE 23,813

PIEZOELECTRIC TRANSDUCER AND METHOD FOR PRODUCING SAME

Robert Adler, Northfield, Ill., assignor to Zenith Radio Corporation, a corporation of Illinois Original No. 2,540,412, dated February 6, 1951, Serial No. 793,892, December 26, 1947. Application for reissue February 3, 1953, Serial No. 334,986

28 Claims. (Cl. 179—100.41)

Matter enclosed in heavy brackets [ ] appears in the original patent but forms no part of this reissue specification; matter printed in italics indicates the additions made by reissue.

This invention relates to piezo-electric transducers and to methods for producing such transducers. It is a primary object of the invention to provide improved artificial transducers having permanent piezo-electric properties and to provide improved methods of producing such transducers.

The use of polycrystalline aggregate such as barium titanate or barium strontium titanate, bonded wtih a ceramic binder, in the production of artificial piezo-electric transducers is specifically disclosed and claimed in the copending application of Walter L. Cherry, Jr., Serial Number 770,163, filed August 22, 1947, *now Patent No. 2,538,554, issued January 16, 1951,* for Piezo-Electric Transducers, and which application is assigned to the same assignee as the present application.

Such artificial piezo-electric transducers as are specifically disclosed in the aforementioned [copending application] *Cherry patent* are particularly useful for high frequency applications. However, for optimum coupling, the direction of mechanical stress must be identical with that of the piezo-electric axis and that of the alternating field; consequently transducers of this type are not readily applicable to audio frequency devices. The minimum frequency at which such transducers may be operated is determined by the maximum capacitance, or electrical compliance, commensurate with practical values of mechanical compliance. If the mechanical compliance is made large enough to suit practical requirements by making the cross-sectional area small, the associated capacitance is too small for audio frequency applications. If, on the other hand, a practical value of capacitance is obtained by making the cross-sectional area large, the mechanical compliance becomes inconveniently small.

It is a particular object of this invention to provide improved artificial piezo-electric transducers which are suitable for operation at audio frequencies.

In accordance with the invention, it has been found that the capacitance or electrical compliance of the artificial transducers may be increased while maintaining a practical value of mechanical compliance by varying the direction of the piezo-electric axis within a single-unit transducer. It is an important object of this invention, therefore, to provide methods for producing a single-unit piezo-electric transducer in which the direction of the piezo-electric polycrystalline aggregate axis varies at a non-uniform rate from portion to portion along at least one major dimension of the aggregate.

It is a further object of the invention to provide an artificial piezo-electric transducer suitable for operation at audio frequencies by virtue of an increased electrical compliance resulting from such non-uniform variation of the direction of the piezo-electric axis.

Yet another object of the invention is to provide a novel process for inducing a piezo-electric effect in a preformed polycrystalline aggregate body, the direction of the piezo-electric axis varying at a non-uniform rate from portion to portion along at least one major dimension of such body in accordance with a predetermined pattern.

Frequent applications of piezo-electric transducers in the audio frequency range are made in phonograph pickups, microphones, and the like. In such applications, it is necessary to provide a transducer which has permanent piezo-electric properties with respect to bending stress. It is an important object of the present invention to provide a piezo-electric polycrystalline aggregate transducer which is suitable for use as a phonograph pickup or the like, and which is rugged, inexpensive, and durable.

In the specification and claims, the term "direction," as applied to the piezo-electric axis or to the polarizing field, includes the concept of sense; therefore the phrase "piezo-electric axes having different directions" includes piezo-electric axes of opposite sense.

The term "unidirectional," as applied to polarizing fields, is employed with reference to time, and not with reference to space. Hence a "unidirectional" polarizing field is one which is produced by a unidirectional potential difference.

The terminology "polycrystalline aggregate" is employed to connote a unitary structure comprising a large number of minute crystals. The term "ceramic" necessarily implies such a structure.

The features of the invention which are believed to be novel are set forth particularly in the appended claims. The invention may more readily be understood, however, by reference to the following description taken in connection with the accompanying drawings, in which like reference numerals indicate like elements, and in which:

Figure 1:
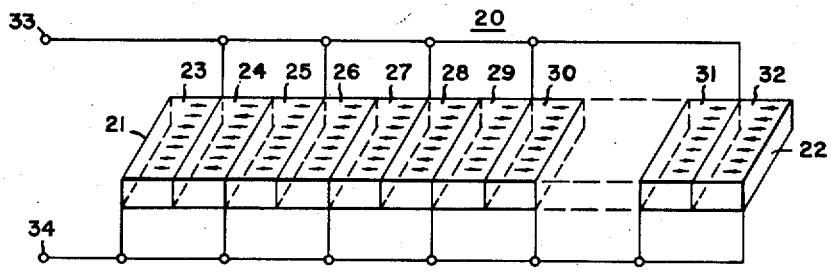
Figure 1 is a schematic representation of a theoretical means for attaining the objects set forth above.

Referring now to Figure 1, there is shown schematically a slab 20 of piezo-electric material, the direction of the piezo-electric axis being assumed to be longitudinal *or substantially parallel to the extended surface of the slab throughout substantially its entire cross-sectional area.* It is seen that the mechanical compliance in the longitudinal direction may well be high enough to suit practical requirements, since the cross-sectional area is small relative to the length, but the capacitance between electrodes located on the small surfaces 21 and 22 separated by the full length of the piece 20 is inconveniently small. In order to increase the capacitance or electrical compliance, it is assumed that slab 20 is theoretically divided into n slices 23—32 of equal length; the dotted lines indicate any desired number of intermediate slices. The capacitance between the imaginary transverse surfaces of each slice is therefore n times that between the two end surfaces 21 and 22 of slab 20, while the mechanical compliance between surfaces 21 and 22 remains unchanged. Furthermore, by interconnecting alternate transverse faces of the imaginary slices 23—32, as shown, and by connecting each set of alternate transverse faces to one of a pair of terminals 33 and 34, the total capacitance between surfaces 21 and 22 is made equivalent to n times the capacitance between the end faces of an individual imaginary slice 23; consequently the effective capacitance between surfaces 21 and 22 is increased by a fractor of $n^2$.

Ideally such a condition may be accomplished by polarizing adjacent slices 23—32 along the same axis but in opposite directions. Such a condition is shown schematically by the arrows which indicate the direction of polarization, and hence the direction of the piezo-electric axis, in each of the imaginary slices.

It has been found that permanent piezo-electric properties may be induced in such polycrystalline aggregate, and furthermore, that the direction of the piezo-electric axis induced in such aggregates is identical to that of the electrostatic flux set up by the polarizing fields. Consequently, such a condition as shown schematically in Figure 1 might be accomplished if suitable unidirectional polarizing fields could be set up between the transverse faces of each of the imaginary slices 23—32. Obviously, such a situation is impractical, since no electrodes exist on the imaginary transverse surfaces between the slices.

Figure 2:
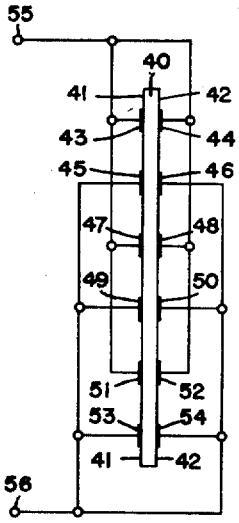
Figure 2 is a schematic representation of a practical method for approximating the theoretical optimum condition shown in Figure 1.

As a practical approach to the optimum condition shown in Figure 1, there is shown in Figure 2 a slab 40 of suitable polycrystalline aggregate, such as a ceramic comprising barium titanate or barium strontium titanate mixed with a small amount of a glass forming oxide and fired to vitrification in accordance with the aforementioned [copending application] *Cherry patent,* on opposite faces 41 and 42 of which have been disposed a plurality of electrical terminals 43—54. For purpose of illustration, twelve terminals have been shown; however, other numbers of terminals may be employed. Alternate pairs of opposite terminals 43, 44, 47, 48, 51, 52 and 45, 46, 49, 50, 53, 54 are interconnected and brought out to a pair of input terminals 55 and 56 respectively. When a unidirectional potential difference is applied between input terminals 55 and 56, adjacent portions of slab 40 are polarized in substantially opposite directions.

Thus, the transducer of Figure 2 comprises a solid polycrystalline aggregate in which a large number of minute individual crystals are bonded together, the aggregate having permanent piezo-electric properties, and the direction of the piezo-electric axis varying at a non-uniform rate from portion to portion along at least one major dimension—the length dimension—of the aggregate. Furthermore, the distribution of the direction of the piezo-electric axis within the aggregate is periodic, comprising a series of identical pairs of adjacent oppositely polarized portions.

Figure 3:
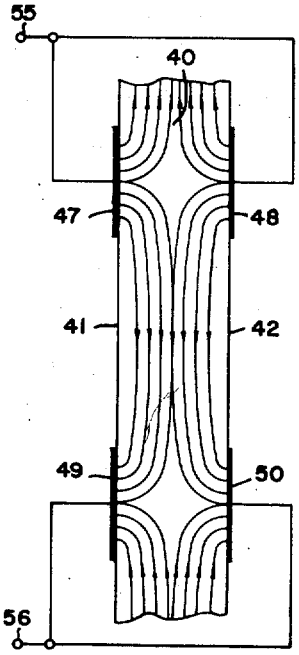
Figure 3 is an enlarged view of a section of Figure 2 showing the electrostatic flux distribution.

In order more fully to show and explain such polarization, there is shown in Figure 3 a detail view of a portion of slab 40 of Figure 2. The electrostatic flux distribution, and hence the direction of polarization, is assumed, for purposes of explanation, to have a sense from + to −. If then, it is assumed that input terminal 55 is the positive terminal and input terminal 56 is the negative terminal, the electrostatic field, and hence the direction of the piezo-electric axis, differs abruptly from portion to portion as schematically shown in Figure 3.

It is seen that the embodiment shown and described in conjunction with Figures 2 and 3 is only an approximation of the ideal shown and described in conjunction with Figure 1. Since those portions of the slab 40 of ceramic material which lie between opposite pairs of terminals, 47 and 48, for example, carry little or no electrostatic flux, these portions may be regarded as being "waste portions." In order to effect a compromise between the desired effective increase in electrical compliance and a minimum of "waste material," it has been found that the width of the individual terminals 43—54 should be of the order of the thickness of the slab 40, and the distance between successive terminals, 47 and 49, for example, should be of the order of twice the thickness of the slab 40. These proportions are the result of practical experiment and are intended in no sense to be construed as limitations, as other proportions may be used with varying degrees of efficiency.

Figure 4:
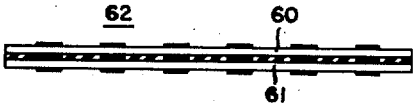
Figure 4 is a schematic representation, partly in section, of a ceramic element, sensitive to bending stress, constructed in accordance with the invention.

In certain audio frequency applications, it is desirable to employ a piezo-electric element which is sensitive to bending. Two elements, each formed in accordance with the method shown and described in connection with Figure 2, may be fastened together, by cement or in some other suitable manner, to provide such a dimorphic element. Such a configuration is shown in Figure 4, wherein a pair of elements 60 and 61 are fastened together to form a composite body 62. In operation one element 60 is instantaneously subjected to tensile stress while the other element 61 is instantaneously subjected to compressive stress, or vice versa. Therefore, care must be taken that elements 60 and 61 are assembled and electrically connected in such a manner that the useful outputs of the individual elements are additive in the composite transducer 62.

Figure 5:
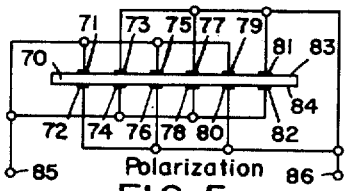
Figures 5–9 are schematic representations of other ceramic bender elements.

While a transducer having permanent piezo-electric properties with respect to bending stress may be produced in the manner shown and described in conjunction with Figure 4, a simplified transducer of this type may be provided. An element sensitive to bending stress may be provided by properly applying polarizing fields to a single unitary polycrystalline aggregate body. Such an element is shown in Figure 5, wherein a unitary slab 70 of barium titanate or other suitable aggregate is provided with a plurality of electrical terminals 71—82 similarly disposed along opposite faces 83 and 84. Alternate terminals 71, 75, and 79 on face 83 and alternate terminals 74, 78, and 82 on face 84 are interconnected and brought out to an input terminal 85, and the remainder of the terminals 72, 73, 76, 77, 80, and 81 are interconnected and brought out to a second input terminal 86.

By applying a unidirectional potential difference between input terminals 85 and 86, unidirectional polarizing fields are applied between successive terminals, 71 and 73, for example, on each face 83, 84 of slab 70. Furthermore, each terminal—71, for example—is oppositely polarized from the terminal—72, for example—which is directly opposite therefrom, and the polarizing fields between opposite pairs of successive terminals—71, 73 and 72, 74 for example—are opposite in sense. By these means, the direction or sense of the piezo-electric axis is made to differ abruptly from portion to portion throughout the single piece 70 in a manner similar to the piezo-electric axis distribution in a composite dimorphic element such as that shown in Figure 4.

Figure 6:
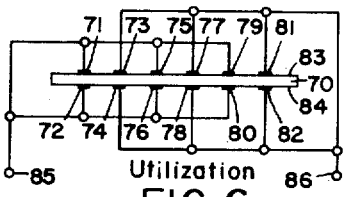

After maintaining the polarizing fields for a sufficient period of time at least to approach saturation of the piezo-electric effect, such fields are removed, and the connections of terminals 71—82 are changed to insure additive outputs in response to bending. Slab 70 with terminals 71—82 reconnected for proper output at terminals 85 and 86 is shown in Figure 6, in which alternate pairs of opposite terminals 71, 72, 75, 76, 79, and 80, and 73, 74, 77, 78, 81, and 82 are respectively interconnected. Such an interconnection is desirable in order to minimize the shunt capacitance between output terminals 85 and 86 which effectively reduces the useful output of such a transducer. The embodiment of Figures 5 and 6 is specifically claimed in the copending divisional application of Walter L. Cherry, Jr., Serial No. 159,613, filed May 2, 1950, *now Patent No. 2,540,-187, issued February 6, 1951*, for Piezo-Electric Transducer and Method for Producing Same, which divisional application is assigned to the present assignee.

Figure 7:
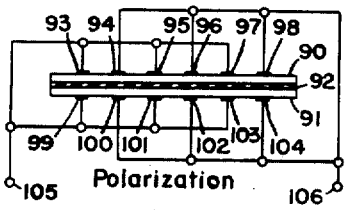
Figure 8:
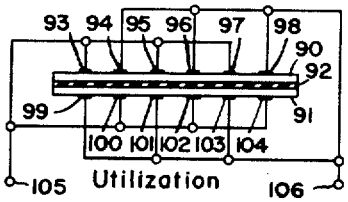

Figure 7 shows an alternative method of producing essentially the same result while greatly reducing any shunt capacitance across the output terminals. In this embodiment, a pair of polycrystalline aggregate bodies 90 and 91 are fastened together by cementing means 92 of low dielectric constant thereby to form a composite body. Cementing means 92 may comprise a layer of cementing material of low dielectric constant, although the desired results may be achieved by glazing slabs 90 and 91 and firing with the glazed sides in contact, by firing a "sandwich" of three ceramic slabs, or by other suitable means. Opposite faces of the composite body are provided with a plurality of similarly disposed electrical terminals 93—98 and 99—104, alternate pairs of opposite terminals 93, 99, 95, 101, 97, 103, and 94, 100, 96, 102, 98, 104 being interconnected and brought out to a pair of input terminals 105 and 106, respectively. After polarizing in the usual manner, the terminal connections on one face of the composite body are reversed to insure additive outputs in response to bending, as shown in Figure 8, and terminals 105 and 106 become output terminals. Although opposite terminals (93 and 99, for example) have opposite polarities associated therewith, the thin layer of cementing material 92 so reduces the effective capacitance shunting the output that satisfactory operation is insured. The embodiment of Figures 7 and 8 is specifically claimed in the copending divisional application of Alexander Ellett, Serial No. 159,-620, filed May 2, 1950, *now Patent No. 2,540,194, issued February 6, 1951*, for Piezo-Electric Transducer and Method for Producing Same, assigned to the present assignee.

While the embodiment shown in Figures 7 and 8 is formed by cementing bodies 90 and 91 together before polarization it is to be understood that the individual bodies 90 and 91 may be polarized separately and then firmly united in such manner as to insure additive outputs in response to bending. Such a method is shown schematically in Figure 9, in which body 90 is separately polarized. Alternate terminals 93, 95, 97 and 94, 96, 98 are connected to respective input terminals 105 and 106. After polarization, two such bodies are cemented or otherwise fastened together to produce a composite body such as that shown in Figure 8.

It is also to be understood that, although pairs of terminals 93—104 have been shown connected in parallel, pairs of terminals may be connected in series in certain applications in which such connection is desirable.

Figure 9:
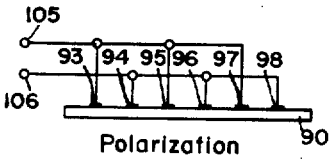

As a variant of this embodiment, two slabs of polycrystalline aggregate such as slab 90 in Figure 9 may be provided each with electrical terminals differently disposed in such a way that, after polarization, such slabs may be fastened together in a manner similar to that shown and described in conjunction with Figure 4. In this way, objectionable shunt capacitance between the output terminals may be avoided without the use of low dielectric constant cementing means.

As a further variant, the composite body shown in Figures 7 and 8 may be polarized with the terminals 93—104 connected as in Figure 8, in which case the terminals 93—104 are reconnected as shown in Figure 7 to insure additive outputs. In this manner, the shunt capacitance across the output is minimized by interconnecting opposite terminals.

Figure 10:
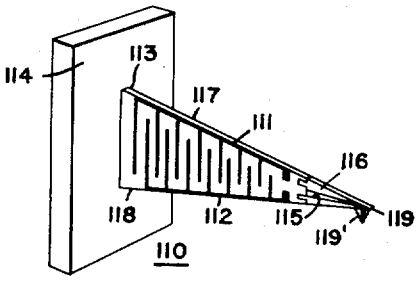

There is shown in Figure 10 a phonograph pickup 110 constructed in accordance with the invention. The terminals 111 and 112 are shown in the form of a pair of intermeshing combs for efficient polarization, and may be of silver paint or other suitable material applied by silk screen, vacuum evaporation, or other suitable process. In a practical application, the terminals applied on the back side (not shown) of element 110 may be made in the form of a mirror image of those applied to the front side in order to minimize the undesired capacitance shunting the output. One end 113 of transducer 110 is firmly clamped in a bracket 114, and the other end 115 is provided with a rigid extension 116 so constructed and arranged that the edges 117 and 118 of transducer 110 and extension 116 all converge to a point 119. Lateral motion at point 119, which may be translated from undulations of a record disc by means of a stylus 119' secured to extension 116 at point 119, then results in corresponding electrical output between terminals 111 and 112; by making transducer 110 trapezoidal in shape, the conditions of a uniform-stress beam are approached.

Figure 11:
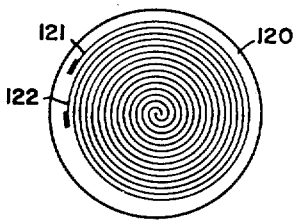

There is shown in Figure 11 a plan view of a further embodiment 120 of the dimorphic type which might be applied in microphones, speakers, or the like. Such an embodiment as shown comprises a pair of circular polycrystalline aggregate bodies cemented together, each of which is supplied with a pair of interleaved spiral-shaped electrical terminals 121 and 122. In such an embodiment, polarization is effected in the usual manner, with the result that the direction of the piezo-electric axis in the finished product is at all points substantially radial, and the sense of the piezo-electric axis is different between successive turns of the terminals 121 and 122.

Figure 12:
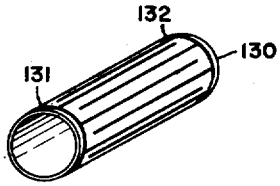
Figures 10–12 are views of several physical embodiments of the invention.

Figure 12 is a perspective view of a cylindrical radiator 130 which is adapted to vibrate radially at a frequency determined by the circumference; such a radiator comprises an element of the type shown in Figure 10 which has been preformed in cylindrical form. After polarization in the manner set forth above, alternating electrical input to terminals 131 and 132 causes radial vibration of element 130.

The present invention also includes other configurations which can never be duplicated by natural piezo-electric crystals, since it is possible to polarize a preformed ceramic body of any shape in any manner consistent with an electrostatic flux pattern. As a further embodiment of the invention, transducers having permanent piezo-electric properties with respect to composite vibration may be produced. The direction of the piezo-electric axis is different in different portions of such a transducer; furthermore, the direction of the piezo-electric axis changes abruptly from portion to portion. There is shown in Figure 13 a transducer of this nature.

Figure 13:
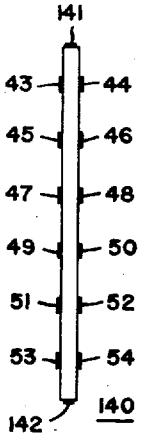
Figure 13 is a schematic representation of a further embodiment of the invention.

In Figure 13, a slab 140 of suitable polycrystalline aggregate, which has been polarized in a manner identical with that shown and described in conjunction with Figure 2, is provided with means for applying an electrostatic field, such means as shown taking the form of a pair of electrodes 141 and 142 applied to respective ends of transducer 140. Upon application of an alternating potential difference between electrodes 141 and 142, an alternating field is produced in body 140, the space relation between the field and the piezo-electric axis being different in different parts of the transducer. Consequently, stresses are produced parallel to the direction of the field, but of opposite signs between successive pairs of polarizing terminals (44, 46 and 46, 48, for example). This results in resonant composite vibration of body 140 at a high frequency, adjacent parts vibrating in opposite phase and at a frequency such that the distance between adjacent polarizing terminals (44 and 46, for example) is substantially a half-wavelength.

Such a transducer is efficient at high frequency, since the high frequency resonant vibration is attained without the accompanying sacrifice of electromechanical coupling associated with harmonic vibration of natural piezo-electric materials. Consequently, high frequency vibration may be induced in a relatively large transducer.

In all of the embodiments of the invention, permanent piezo-electric properties are imparted to a solid polycrystalline aggregate in such a manner that the direction of the piezo-electric axis *is longitudinal or substantially parallel to the extended surface of the aggregate throughout substantially the entire element, with the direction of the piezo-electric axis varying* [varies] at a non-unifrom rate from portion to portion along at least one major *or surface* dimension of the aggregate. In the embodiments of Figures 1–10 and 13, the major dimension along which such non-uniform variation of the direction of the piezo-electric axis exists is the length or longitudinal dimension. In the embodiment of Figure 11, the direction of the piezo-electric axis varies at a non-uniform rate from portion to portion along any radial dimension, while in the embodiment of Figure 12, the direction of the piezo-electric axis varies at a non-uniform rate from portion to portion along the circumferential dimension of the body.

While there have been shown and described certain preferred embodiments of the invention, it will be understood that numerous variations and modifications may be made, and it is contemplated, in the appended claims, to cover all such variations and modifications as fall within the true spirit and scope of the invention.

I claim:

1. The process of producing a piezo-electric effect in a solid polycrystalline aggregate in which individual crystals are bonded together, *said aggregate having an extended surface area which is large relative to its transverse cross-sectional area,* said process including producing a unidirectional electrostatic polarizing field *which, throughout said cross-sectional area, is substantially parallel to said extended surface and substantially perpendicular to said cross-sectional area,* the direction of [which varies] *said field varying* in a non-uniform rate from portion to portion along at least one major *surface* dimension of said aggregate, and maintaining said field for a substantial period of time at least approaching that necessary for saturation of said effect.

2. The process of producing a piezo-electric effect in a solid aggregate in which individual crystals of barium titanate are bonded together, *said aggregate having an extended surface area which is large relative to its transverse cross-sectional area,* said process including producing a unidirectional electrostatic polarizing field *which, throughout said cross-sectional area, is substantially parallel to said extended surface and substantially perpendicular to said cross-sectional area,* the direction of [which varies] *said field varying* at a non-uniform rate from portion to portion along at least one major *surface* dimension of said aggregate, and maintaining said field for a substantial period of time at least approaching that necessary for saturation of said effect.

3. The process of producing a permanently piezo-electric ceramic body, said process comprising heating a thorough mixture of polycrystalline material and ceramic binder to a temperature sufficient to bond the individual crystals of said material together thereby to form a solid polycrystalline aggregate, *said aggregate having an extended surface area which is large relative to its transverse cross-sectional area,* thereafter producing a unidirectional electrostatic polarizing field *which, throughout said cross-sectional area, is substantially parallel to said extended surface and substantially perpendicular to said cross-sectional area,* the direction of [which varies] *said field varying* at a non-uniform rate from portion to portion along at least one major *surface* dimension of said aggregate, and maintaining said field for a period of time sufficient at least to approach saturation of the piezo-electric effect in said aggregate.

4. The process of producing a permanently piezo-electric ceramic body, said process comprising heating a thorough mixture of polycrystalline material and ceramic binder to a temperature sufficient to bond the individual crystals of said material together to form a solid polycrystalline aggregate, similarly disposing along each of two opposite faces of said aggregate a plurality of electrical terminals, producing unidirectional polarizing fields *substantially parallel to said faces throughout said body and* having substantially opposite directions between successive pairs of terminals on each of said faces, and maintaining said fields for a period of time at least approaching that necessary for saturation of the piezo-electric effect in said aggregate.

5. The process of producing a permanently piezo-electric ceramic body, said process comprising similarly disposing along each of two opposite faces of a solid polycrystalline aggregate a plurality of parallel electrical terminals, applying unidirectional polarizing fields *substantially parallel to said faces throughout said body and* having substantially opposite directions between successive pairs of terminals on each of said faces, and maintaining said fields for a sufficient period of time at least to approach saturation of the piezo-electric effect in said aggregate.

6. A transducing element including a solid ceramic polycrystalline aggregate *having an extended surface area large relative to its transverse cross-sectional area and* in which a large number of minute individual crystals are bonded together, said aggregate having permanent piezo-electric properties, and the direction of the piezo-electric axis, *throughout said element, being substantially parallel to said extended surface and substantially perpendicular to said cross-sectional area and* varying at a non-uniform rate from portion to portion along at least one major *surface* dimension of said aggregate.

7. A transducing element including a solid polycrystalline aggregate *having an extended surface area which is large relative to its transverse cross-sectional area,* said aggregate including a large number of minute individual crystals of barium titanate bonded together by a ceramic binder, said aggregate possessing permanent piezo-electric properties and the direction of the piezo-electric axis, *throughout said cross-sectional area, being substantially parallel to said extended surface and substantially perpendicular to said cross-sectional area and* varying at a non-uniform rate from portion to portion along at least one major *surface* dimension of said aggregate.

8. A transducing element including a solid polycrystalline aggregate *having an extended surface area which is large relative to its transverse cross-sectional area,* said aggregate including a large number of minute individual crystals of barium strontium titanate bonded together by a ceramic binder, said aggregate possessing permanent piezo-electric properties and the direction of the piezo-electric axis, *throughout said cross-sectional area, being substantially parallel to said extended surface and substantially perpendicular to said cross-sectional area and* varying at a non-uniform rate from portion to portion along at least one major *surface* dimension of said aggregate.

9. A solid polycrystalline aggregate body having a plurality of electrical terminals similarly disposed along opposite faces thereof, said body having permanent piezo-electric properties and the direction of the piezo-electric axis being *substantially parallel to said faces throughout said body and* substantially opposite between successive pairs of terminals on each of said faces.

10. A ceramic element having permanent piezo-electric properties, said element including a solid polycrystalline aggregate, a plurality of electrical terminals similarly disposed along each of two opposite faces of said aggregate, the direction of the piezo-electric axis being *substantially parallel to said faces throughout said element and* substantially opposite between successive pairs of terminals on each of said faces, and the direction of the piezo-electric axis between successive pairs of terminals on one of said faces being the same as the direction of the piezo-electric axis between corresponding pairs of terminals on the other of said faces.

11. A ceramic transducing element having permanent piezo-electric properties, said element including a pair of similar polycrystalline aggregate bodies, and a plurality of parallel electrical terminals similarly disposed along each of two opposite faces of each of said bodies, the direction of the piezo-electric axis being *substantially parallel to said faces throughout said bodies and* substantially opposite between successive pairs of terminals on each of said faces, and a pair of corresponding terminal-bearing faces of said bodies being firmly united by cementing means.

12. A ceramic element having permanent piezo-electric properties, said element including a pair of solid polycrystalline aggregate bodies fastened together thereby to form a composite body, and a plurality of electrical terminals disposed along each of two opposite faces of said composite body, the direction of the piezo-electric axis being *substantially parallel to said faces throughout said bodies and* substantially opposite between successive pairs of terminals on each of said faces.

13. A ceramic element having permanent piezo-electric properties, said element including a pair of solid polycrystalline aggregate bodies fastened together thereby to form a composite body, said aggregate including individual crystals of barium titanate bonded together with a ceramic binder, a plurality of electrical terminals disposed along each of two opposite faces of said composite body, the direction of the piezo-electric axis being *substantially parallel to said faces throughout the bodies and* substantially opposite between successive pairs of terminals on each of said faces.

14. A ceramic element having permanent piezo-electric properties, said element including a pair of solid polycrystalline aggregate bodies firmly united to form a composite body, a pair of interleaved spiral-shaped electrical terminals disposed on each of the opposite faces of said composite body, the direction of the piezo-electric axis being always substantially radial and being different between successive turns of said spiral-shaped terminals.

15. A hollow cylindrical polycrystalline aggregate body having permanent piezo-electric properties and having a plurality of parallel axial electrical terminals disposed along the outer surface thereof, the direction of the piezo-electric axis being at all points substantially circumferential and being substantially opposite between successive pairs of said terminals.

16. A ceramic element having permanent piezo-electric properties, said element including a solid polycrystalline aggregate body *having an extended surface area large relative to its transverse cross-sectional area, said aggregate having permanent piezo-electric properties with the direction of the piezo-electric axis throughout said aggregate being substantially parallel to said extended surface and substantially perpendicular to said cross-sectional area, and* in different portions of which the direction of the piezo-electric axis is different, and means for applying to said body an electrostatic field, the space relation between said field and said piezo-electric axis being different in different parts of said element, whereby stresses of opposite sign in said different parts are simultaneously produced in response to said field.

17. A pickup element for a phonograph or the like, said element comprising a permanently piezo-electric body of barium titanate individual crystals of which are bonded together by a ceramic binder, a plurality of parallel electrical terminals disposed along opposite faces of said body, the terminal disposition on one of said faces being substantially a mirror image of the terminal disposition on the other of said faces, the direction of the piezo-electric axis being *substantially parallel to said faces substantially throughout said body and* substantially opposite between successive pairs of terminals on each of said faces, and means for bending said composite body in response to undulations in a record disk.

18. A transducing element having electrical terminals and including a solid ceramic polycrystalline aggregate in which a large number of minute individual crystals are bonded together, *said aggregate having an extended surface area which is large relative to its transverse cross-sectional area,* said aggregate having permanent piezo-electric properties, and the direction of the piezo-electric axis, *throughout said cross-sectional area, being substantially parallel to said extended surface and substantially perpendicular to said cross-sectional area and* being substantially opposite in adjacent portions of said aggregate.

19. A transducing element having electrical terminals and including a solid polycrystalline aggregate *having an extended surface area which is large relative to its transverse cross-sectional area,* said aggregate including a large number of minute individual crystals of barium titanate bonded together by a ceramic binder, said aggregate possessing permanent piezo-electric properties and the direction of the piezo-electric axis, *throughout said element, being substantially parallel to said extended surface and substantially perpendicular to said cross-sectional area and* being substantially opposite in adjacent portions of said aggregate.

20. A transducing element having electrical terminals and including a solid polycrystalline aggregate *having an extended surface area which is large relative to its transverse cross-sectional area,* said aggregate including a large number of minute individual crystals of barium strontium titanate bonded together by a ceramic binder, said aggregate possessing permanent piezo-electric properties and the direction of the piezo-electric axis, *throughout said element, being substantially parallel to said extended surface and substantially perpendicular to said cross-sectional area and* being substantially opposite in adjacent portions of said aggregate.

21. A transducing element including a slab of solid polycrystalline aggregate in which a large number of minute individual crystals are bonded together, said aggregate *having an extended surface area which is large relative to its transverse cross-sectional area and* having permanent piezo-electric properties, said slab comprising at least a pair of adjacent elemental portions along one face thereof, *the direction of the piezo-electric axis in each of said portions, throughout said cross-sectional area, being substantially parallel to said extended surface and substantially perpendicular to said cross-sectional area and* the direction of the piezo-electric axis in one of said portions being substantially opposite to the direction of the piezo-electric axis in the other of said portions.

22. A transducing element including a slab of solid polycrystalline aggregate in which a large number of minute individual crystals are bonded together, said aggregate *having an extended surface area which is large relative to its transverse cross-sectional area and* having permanent piezo-electric properties, said slab comprising a plurality of elemental portions along one face thereof, *the direction of the piezo-electric axis in each of said portions, throughout said cross-sectional area, being substantially parallel to said extended surface and substantially perpendicular to said cross-sectional area,* the directions of the piezo-electric axis in alternate ones of said portions being substantially identical, and the direction of the pizeo-electric axis in adjacent portions being substantially opposite.

23. A transducing element including a slab of solid polycrystalline aggregate in which a large number of minute individual crystals are bonded together, said aggregate *having an extended surface area which is large relative to its transverse cross-sectional area and* having permanent piezo-electric properties, said slab having a pair of oppositely disposed faces, each of said faces comprising a plurality of elemental portions, *the direction of the piezo-electric axis in each of said portions, throughout said cross-sectional area, being substantially parallel to said extended surface and substantially perpendicular to said cross-sectional area,* the directions of the piezo-electric axis in alternate ones of said portions on each face being substantially identical, and the direction of the piezo-electric axis in each of said portions being substantially opposite to the direction of the piezo-electric axis in any adjacent portion of the same face.

24. A transducing element including a solid polycrystalline aggregate in which a large number of minute individual crystals are bonded together, said aggregate *having an extended surface area which is large relative to its transverse cross-sectional area and* having permanent piezo-electric properties, and the direction of the piezo-electric axis, *throughout said element, being substantially parallel to said extended surface and substantially perpendicular to said cross-sectional area and* differing abruptly from portion to portion in said aggregate.

25. A transducing element including a solid polycrystalline aggregate in which a large number of minute individual crystals are bonded together, said aggregate having *an extended surface area which is large relative to its transverse cross-sectional area and having* permanent piezo-electric properties, and the direction of the piezo-electric axis, *throughout said element, being substantially parallel to said extended surface and substantially perpendicular to said cross-sectional area, the direction of the piezo-electric axis* differing abruptly from portion to portion along one dimension and differing continuously from portion to portion along another dimension of said aggregate.

26. A transducing element including a solid polycrystalline aggregate in which a large number of minute individual crystals are bonded together, said aggregate *having an extended surface area which is large relative to its transverse cross-sectional area and* having permanent piezoelectric properties, and the direction of the piezoelectric axis, *throughout said element, being substantially parallel to said extended surface and substantially perpendicular to said cross-sectional area, the direction of the piezo-electric axis* differing abruptly from portion to portion along one dimension and differing smoothly and continuously from portion to portion along another dimension of said aggregate, said other dimension being substantially perpendicular to said one dimension.

27. A unitary piezo-electric ceramic transducer *having an extended surface area large relative to its transverse cross-sectional area and* having adjacent [oppositely polarized] portions *longitudinally polarized, throughout said cross-sectional area, in opposite directions substantially parallel to said extended surface and substantially perpendicular to said cross-sectional area.*

28. A transducing element including a solid polycrystalline aggregate in which a large number of minute individual crystals are bonded together, said aggregate *having an extended surface area which is large relative to its transverse cross-sectional area and* having permanent piezoelectric properties, *the direction of the piezoelectric axis, throughout said element, being substantially parallel to said extended surface and substantially perpendicular to said cross-sectional area,* and the direction of the piezo-electric axis varying at a non-uniform rate from portion to portion along at least one major *surface* dimension of said aggregate and having a periodic distribution throughout said aggregate.

References Cited in the file of this patent or the original patent

UNITED STATES PATENTS

| Number | Name | Date |
|---|---|---|
| 2,242,756 | Pope | May 20, 1941 |
| 2,486,560 | Gray | Nov. 1, 1949 |

OTHER REFERENCES

Roberts, Physical Review, vol. 71, pages 890–895, June 15, 1947.